United States Patent [19]

Kato

[11] 4,114,735
[45] Sep. 19, 1978

[54] HYDRAULIC DAMPER AND VALVE STRUCTURE

[75] Inventor: Tetuo Kato, Yokohama, Japan

[73] Assignee: Tokico Ltd., Japan

[21] Appl. No.: 775,644

[22] Filed: Mar. 7, 1977

[30] Foreign Application Priority Data

Mar. 15, 1976 [JP] Japan .................................. 51-27979
Apr. 20, 1976 [JP] Japan ............................. 51-49580[U]

[51] Int. Cl.² ........................................... F16F 9/348
[52] U.S. Cl. .................................. 188/282; 137/493; 188/322
[58] Field of Search ............... 188/282, 317, 320, 322; 137/854, 852, 860, 493

[56] References Cited

U.S. PATENT DOCUMENTS

| | | | |
|---|---|---|---|
| 2,717,058 | 9/1955 | Brundrett | 188/320 |
| 3,312,312 | 4/1967 | De Carbon | 188/317 |
| 4,034,860 | 7/1977 | Leppich | 137/854 X |

FOREIGN PATENT DOCUMENTS 951,693 10/1956 Fed. Rep. of Germany ........... 188/322

Primary Examiner—George E. A. Halvosa
Attorney, Agent, or Firm—Wenderoth, Lind & Ponack

[57] ABSTRACT

A hydraulic damper of the type including a valve disc deflectable around the inner and outer peripheries thereof to form fluid passages around the outer and inner circumferences thereof when the damper is actuated in opposite directions. A movable valve seat defining an annular valve seat having a diameter intermediate the inner and outer diameters of the valve disc is disposed to cooperate with the valve disc such that the effective pressure receiving area of the valve disc is reduced when the valve disc deflects in one direction and the movable valve seat is movable substantially freely when the valve disc deflects in the other direction.

7 Claims, 7 Drawing Figures

HYDRAULIC DAMPER AND VALVE STRUCTURE

This invention relates to improvements in a hydraulic damper which includes a damping force generating mechanism adapted to generate a hydraulic damping force during both the extension and contraction strokes of the damper.

Many types of damping force generating devices have been proposed for use with reciprocating type hydraulic dampers of the prior art, one of which comprises a single valve for generating damping force during both the extension and contraction strokes, and the valve is usually disposed in a piston. One typical prior art hydraulic damper comprises an annular valve disc (one or two or more overlapped thin metal plates) disposed on one side of a piston and supported by two opposed fixed valve seats which support the inner and outer peripheral portions of the disc respectively, and when the piston moves reciprocably in a cylinder (in the extending or contracting direction) pressurized oil deflects the inner or the outer peripheral portions of the valve disc to form a fluid passage at that portion, whereby a damping force is generated from the hydraulic resistance to the pressurized oil passing through the fluid passage.

However, in the damping force generating mechanism with the aforesaid construction, the ratio of the damping forces in the extending and contracting directions has a constant value since the fluid passage is formed solely by the deflection of the inner or the outer peripheral portion of the same value disc and, therefore, it is very difficult to obtain the desired ratio of the damping forces.

An object of the present invention is to provide a hydraulic damper having a damping force generating mechanism which can attain any desired ratio of the damping forces in the extending and contracting strokes and has a simple construction.

According to the present invention, a movable valve seat is disposed adjacent to the valve disc for restricting the effective pressure receiving area of the valve disc when the valve disc deflects in one direction, and the valve seat is adapted to move substantially freely with the valve disc when the valve disc deflects in the opposite direction.

According to one feature of the present invention, a second valve disc is interposed between the movable valve seat and the first mentioned valve disc. The second valve disc acts to cooperate with the movable valve seat and the first valve disc when the first valve disc deflects in one direction, but moves substantially freely with the movable valve disc when the first valve disc deflects in the opposite direction.

Some embodiments of the present invention will be illustrated in the attached drawings, in which.

Figure 1:
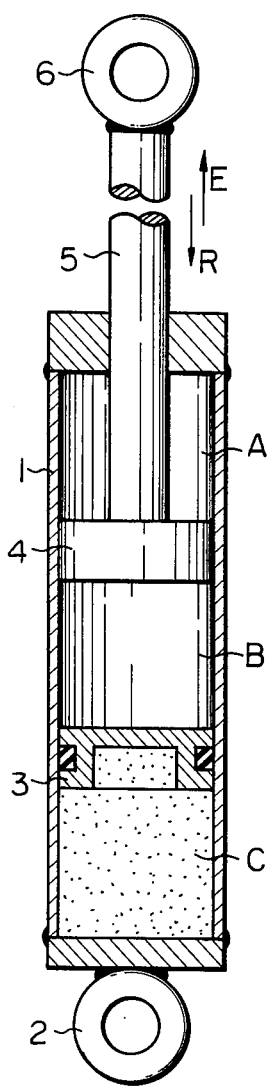
FIG. 1 is a schematic cross-sectional view of a hydraulic damper according to the present invention.

FIG. 1 shows an example of a reciprocating type hydraulic damper, in which a cylinder 1 receiving hydraulic oil therein is provided with a mounting ring 2 at the lower end thereof for mounting the damper on a vehicle or the like. A free piston 3 is slidably received in the cylinder 1, and a gas is contained between the piston 3 and the lower end of the cylinder 1. The free piston 3 moves in the cylinder 1 following the movement of a piston 4 (which will hereinafter be described in detail) to form a volume compensating chamber C in the cylinder 1 for compensating for the change in volume caused by ingress or retraction of a rod 5 attached to the piston 4. The piston 4 divides the oil chamber in the cylinder 1 into two oil chamber parts A and B and is provided with a damping force generating mechanism according to the present invention. One end of the rod 5 is secured to the piston 4 and the other end thereof projects slidably through the upper end of the cylinder 1 to the outside. A mounting ring 6 is secured to the projecting end of the rod 5 for mounting the damper to the vehicle or the like.

Figure 2:
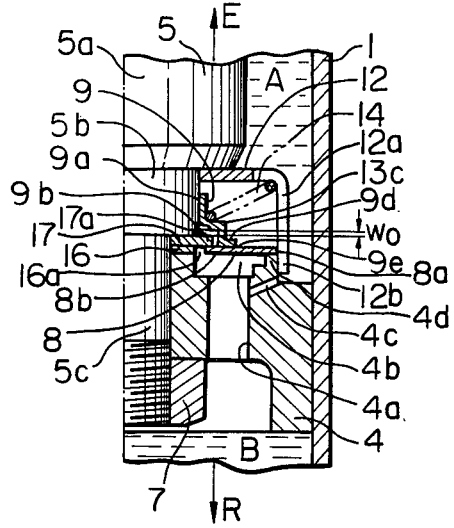
FIGS. 2 and 3 are longitudinal half-sectional views showing the essential portions of the damping force generating mechanism according to the present invention.
Figure 3:
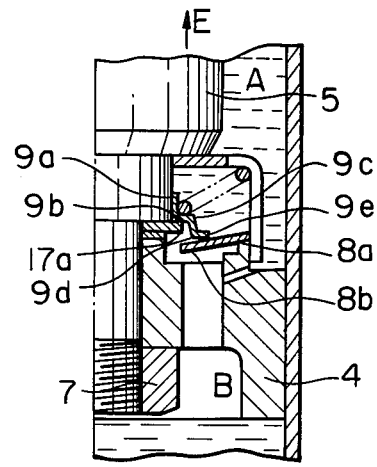

In the embodiment shown in FIGS. 2 and 3, the piston 4 has a suitable number of holes 4a extending therethrough in the direction of the axis of the piston, and the upper ends of the holes 4a open to the chamber A through an annular groove 4b, so that, a connecting passage communicating chambers A and B is formed by the bores 4a and the groove 4b. Further, one or more orifices 4c permanently connecting the chambers A and B is formed in the piston 4. The rod 5 has a large diameter portion 5a, an intermediate diameter portion 5b and a small diameter portion 5c as shown. A valve disc 8 formed of a single or two or more thin annular metal plates engages at the outer peripheral portion 8a thereof with an annular peripheral portion 4a of the piston 4 forming a fixed valve seat. The inner peripheral portion 8b of the valve disc 8 is supported on the outer peripheral portion 17a of a stop 17 which acts as a fixed valve seat. The fixed valve seats 4a and 17a are oppositely disposed as shown. Shown at 16 is a washer disposed between the stop 17 and the piston 4, and by adjusting the thickness of the washer 16 it is possible to adjust the distance between the fixed valve seats 4a and 17a in the direction of the axis of the piston to adjust the initial deflection of the valve disc 8. A movable valve seat 9 according to the feature of the present invention is slidably mounted on the intermediate diameter portion 5b of the rod 5. The movable valve seat 9 has a guide bore 9a fitting on the rod portion 5b, a stop engaging portion 9b extending radially outward from the lower end of a cylindrical portion defining the guide bore 9a, a large diameter cylindrical portion 9c extending downwardly from the outer edge of the stop engaging portion 9b, and a flange portion 9d extending radially outward from the lower end of the cylindrical portion 9c as shown in the drawings. The axial dimension of the cylindrical portion 9c of the distance between the stop engaging portion 9b and the flange portion 9d in the direction of the axis of the piston is larger than the thickness of the stop 17, and the inner diameter of the cylindrical portion 9c is larger than the outer diameter of the stop 17. A generally cup-shaped valve guide 12 is fitted on the intermediate diameter portion 5b of the rod 5 and engages with a stepped portion defined between the larger diameter portion 5a and the intermediate diameter portion 5b of the rod. A suitable number of slits 12a are formed in the cylindrical portion 12b of the valve guide 12, and the lower end of the cylindrical portion 12b is fitted on the outer periphery of the fixed valve seat 4a of the piston 4. The inner periphery of the cylindrical portion 12b is adapted to guide the outer periphery 8a of the valve disc 8. A coil spring 14 extends between the valve guide 12 and the movable valve seat 9 to urge the valve seat 9 towards the valve disc 8. In the normal unactuated position shown in FIG. 2, the valve disc engages with and is supported by the fixed valve seats 4a and 17a since the initial load on the valve disc 8 is larger than the spring force of the coil spring 14. The flange portion 9d of the movable valve seat 9 engages the valve disc 8 to define a valve seat portion 9e. An initial clearance $w_o$ is formed between the upper surface of the stop 17 and the lower surface of the stop engaging portion 9b of the movable valve seat 9.

The operation of the hydraulic damper according to the invention will be described in conjunction with FIGS. 1, 2, 3 and 4.

Firstly, the piston 4 and the rod 5 are assumed to move in the direction of arrow R or the retracting or the contracting direction.

Figure 4:
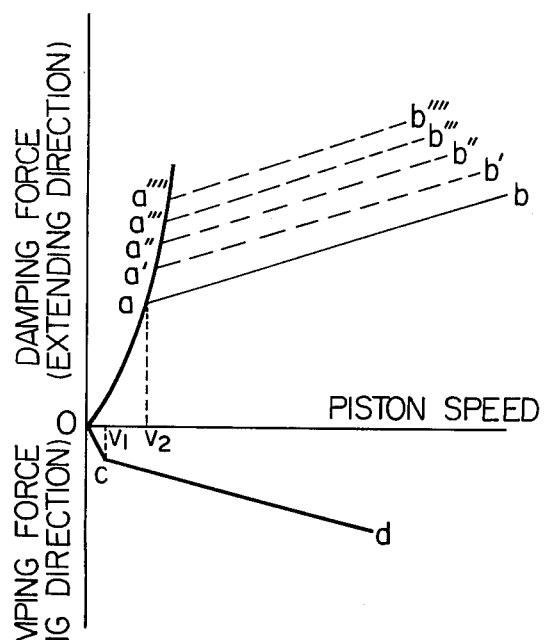
FIG. 4 is a damping force-piston speed diagram.

When the piston speed is below a predetermined low speed $V_1$, the oil in the chamber B flows only through the orifice 4c and into the chamber A, and a damping force shown by line "oc" in FIG. 4 is generated.

When the piston speed exceeds the predetermined speed $V_1$, the oil in the chamber B deflects the valve disc 8 around the fixed valve seat 17a supporting the inner periphery of the valve disc 8 so that the outer periphery 8a is deflected upward to form an annular passage, and the oil flows into the chamber A. The damping force thus generated is shown by line "cd" in FIG. 4 which has an inclination more gradual than the line "oc". The movable valve seat 9 is moved upward when the valve disc 8 deflects upward but there is no substantial effect on the damping force characteristics during the retracting stroke of the damper.

Secondly, the hydraulic damper is assumed to move in an extension stroke, i.e., the piston 4 and the rod 5 move in the direction of arrow E in the drawings.

When the piston speed is below the aforesaid speed $V_1$, the oil in the chamber A flows into the chamber B only through the orifice 4c.

When the piston speed exceeds $V_1$, the oil in the chamber A tends to deflect the inner periphery 8b of the valve disc 8 to move it away from the fixed valve seat 17a, but, as shown in FIG. 3, the movable valve seat 9 follows the movement of the valve disc 8 to prevent oil flow through the clearance between the inner periphery 8b and the valve seat 17a. Thus oil flow between the chambers A and B is effected only through the orifice 4c and the resulting damping force is depicted by line "oa" in FIG. 4.

When the piston speed exceeds a predetermined speed $V_2$ which is larger than $V_1$, the movable valve seat 9 abuts the stop 17 and the valve disc 8 moves away from the valve seat portion 9e of the movable valve seat 9 so that an oil passage is formed at that portion. The damping force is depicted by line "ab" in FIG. 4 which has an inclination more gradual than the line "oa".

The ratio between the damping forces during the extension and retraction strokes will be described.

The effective pressure receiving area of the valve disc 8 during the retraction stroke is determined by an annular area defined between the outer diameter of the inner periphery of the fixed valve seat 17a and the inner diameter of the outer periphery of the fixed valve seat 4a, but during the extension stroke, the effective area is determined by an annular area defined between the inner diameter of the outer periphery of the fixed valve seat 4a and the outer diameter of the flange portion 9d of the movable valve seat 9, and which area is smaller than the effective area during the retraction stroke.

Therefore, the damping force "oab" during the extension stroke is larger than the damping force "ocd" in the retraction stroke, and it is easy to set a desired large value of the ratio therebetween.

When the outer diameter of the flange portion 9d of the movable valve seat 9 is increased the damping force during the extension stroke will increase as depicted on lines "oa'b'", "oa''b''", . . . . in FIG. 4 without changing the damping force during the retraction stroke.

A similar effect can be attained by increasing the clearance $w_o$ which determines the amount of deflection of the valve disc 8 during opening of the oil passage during the extension stroke. It will be noted that the clearance $w_o$ can be set to zero, and that the clearance $w_o$ and the outer diameter of the flange portion 9d may be changed simultaneously or independently to obtain a desired damping force ratio.

Preferably, the movable valve seat 9 is formed of a pressed element which makes it possible to form the valve seat 9 with the desired clearance $w_o$ and the outer diameter of the flange portion 9d easily.

Figure 5:
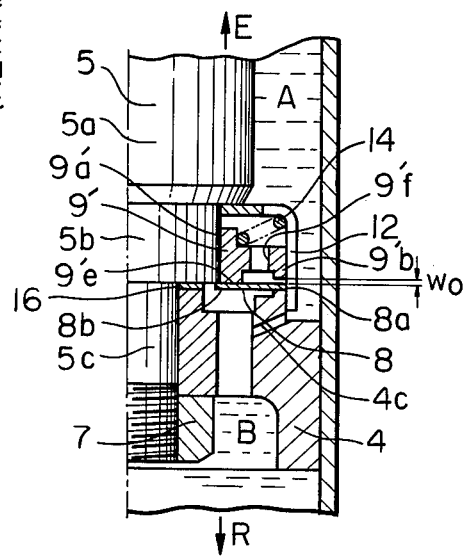
FIG. 5 is a longitudinal half-sectional view of a second embodiment of the present invention.

FIG. 5 shows a second embodiment of the present invention, in which parts corresponding to the first embodiment are denoted by corresponding numerals. A movable valve seat 9' is formed of a cylindrical member having a guide hole 9'a slidably fitted on the intermediate diameter 5b of the rod, and the outer periphery of the valve seat 9' slidably engages the cylindrical portion 12b of the valve guide 12. The inner peripheral portion of the lower end of the valve seat 9' constitutes the seat 9'e for cooperating with the upper side surface of the valve disc 8 to restrict the effective pressure receiving area of the valve disc during the extension stroke of the damper. The outer peripheral portion 9'b of the lower end of the movable valve seat 9 is adapted to engage the valve disc 8 to stop the movement of the movable valve seat 9 in the downward direction. But normally a predetermined axial clearance $w_o$ is left therebetween. In this embodiment, the inner peripheral portion 8b of the valve disc 8 directly engages a shoulder formed on a step defined between the intermediate diameter portion 5b and the small diameter portion 5c of the rod thereby making it possible to omit the stop 17 which is present in the first embodiment. The construction and the operation of the second embodiment is otherwise the same as that of the first embodiment.

Figure 6:
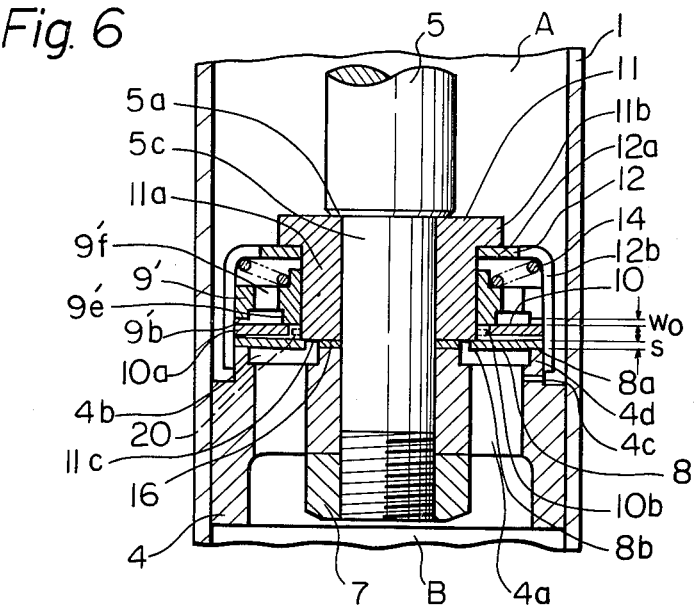
FIG. 6 is a longitudinal cross-sectional view of another embodiment of the present invention.

The embodiment shown in FIG. 6 is generally similar to the second embodiment, and corresponding numerals are applied on the corresponding parts.

In this embodiment, a second disc 10 having an inner diameter larger than that of the valve disc 8 is interposed between the valve disc (first disc) 8 and the movable valve seat 9'. The inner peripheral portion 10b of the second disc 10 cooperates with the seat portion 9'e of the movable valve seat 9. The intermediate diameter portion 5b of the rod 5 shown in the second embodiment is replaced by a valve retainer 11 as shown, and a fixed valve seat 11c is constituted by the lower end of the valve retainer 11 to cooperate with the inner peripheral portion 8b of the first disc 8. The distance s between the fixed valve seats 11c and 4a in the direction of the axis of the piston is set by adjusting the thickness of the washer 16 to provide for an initial deflection or load of the first disc 8. The size of s is usually less than the thickness of the disc 8.

Figure 7:
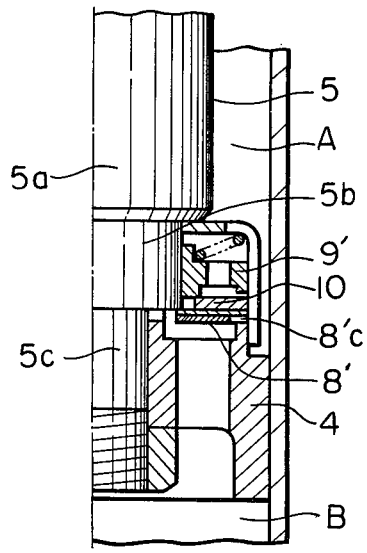
FIG. 7 is a half-sectional view of a modified form of the embodiment of FIG. 6.

FIG. 7 shows another embodiment of the present invention which is generally similar to the embodiments shown in FIGS. 5 and 6 respectively, and corresponding numerals are applied to corresponding parts. In this embodiment a first disc 8' is formed of two (or more) thin annular overlapping metal plates, and the fixed orifice connecting the upper and lower sides of the piston permanently is formed of one or more cut-outs 8'c formed in the outer periphery of the lowermost one of the overlapping discs.

The embodiments shown in FIGS. 6 and 7 differ from the first and second embodiments shown in FIGS. 2, 3 and 4 in that a second disc 10 is interposed between the first disc 8 or 8' and the movable valve seat 9 or 9'. During the retraction stroke of the damper the second disc will move simply with the first disc without generating any substantial damping force, but during the extension stroke of the damper the second disc 10 receives hydraulic pressure in the chamber A on the effective pressure receiving area defined between the outer diameter of the valve seat portion 9'e of the movable valve seat 9' and the inner diameter of the fixed valve seat 4a and deflects while cooperating with the first valve disc 8 or 8'.

Thus, the ratio between the damping forces during the extension and retraction strokes can further be increased.

In FIG. 6, the clearance $w_o$ is between the lower end of the outer peripheral portion of the movable valve seat 9' and the upper end of the second disc 10 and is set to control the movement of the movable valve disc 9' downward from the neutral or unactuated position, but a suitable stop 20 may be provided on the valve retainer 11 as shown by the broken lines in the drawing to restrict the movement of the valve seat 9'.

In the embodiments shown in the drawings, the damping force generating mechanism is provided on the upper side (the rod side) of the piston, but the mechanism may be provided on the lower side of the piston to generate a large damping force during the retraction stroke of the damper.

Although the present invention has been described in conjunction with a single tube type hydraulic damper having a piston with the damping force generating device provided thereon, the present invention may also be applied to a dual tube damper wherein the damping force generating device may be provided in a bottom member partitioning the inner and outer tubes of the damper.

What is claimed is:

1. A hydraulic damper having an oil chamber partitioning member such as a piston or a bottom member or the like and having a passage therein connecting two oil chambers partitioned by said partitioning member, and a damping force generating device disposed in said partitioning member, said damping force generating device comprising a flexible valve disc means adapted to open or close said passage for generating a damping force against the oil flowing across the device in opposite directions, a fixed outer periphery supporting valve seat on said partitioning member for engaging with the outer periphery of said valve disc means on one face of said valve disc means, a fixed inner periphery supporting valve seat on said partitioning member for engaging with the inner periphery of the valve disc means on the other face of said valve disc means, and a movable spring loaded valve seat sealingly engaged between said other face of said valve disc means around the entire periphery thereof and said partitioning member for restricting the effective pressure receiving area of said valve disc means and movably mounted on said partitioning member for limited movement in the direction of movement of said valve disc means while remaining in sealing engagement with said valve disc means when the valve disc means deflects in one direction under the spring loading thereof for delaying the opening of said passage and movable with the valve disc means against the spring loading thereof when the valve disc means deflects in the other direction.

2. A hydraulic damper according to claim 1 wherein a relatively weak spring engages said movable valve seat for providing said spring loading of said movable valve seat toward said valve disc means.

3. A hydraulic damper according to claim 1 wherein the valve disc means is a single disc and the movable valve seat has an abutment thereon spaced in the direction of movement of said single disc in said other direction, and a stop means on said partition member engaged by said abutment at the limit of movement of said movable valve seat when said disc deflects in said one direction.

4. A hydraulic damper according to claim 3 in which said abutment and said stop are at the inner periphery on said single disc.

5. A hydraulic damper according to claim 3 in which said abutment is on the outer periphery of said movable valve member and said stop is at the outer periphery supporting valve seat.

6. A hydraulic damper according to claim 1 wherein said valve disc means is a first valve disc and a second valve disc disposed between said first valve disc and said movable valve member with the inner periphery of said second valve disc being supported on the movable valve seat and the inner periphery of said first disc being supported on said inner periphery supporting valve seat.

7. A hydraulic damper according to claim 6 wherein the outer periphery of said second valve disc is supported on the outer periphery of the first valve disc.

* * * * *